United States Patent [19]
Takagi et al.

[11] Patent Number: 5,766,294
[45] Date of Patent: Jun. 16, 1998

[54] METHOD AND APPARATUS FOR PRODUCING AN OPTICAL ELEMENT USING A MOLDING BLOCK AND A TEMPERATURE EFFECTING MECHANISM CONTACTING THE MOLDING BLOCK FOR HEAT EXCHANGE

[75] Inventors: Kazuaki Takagi, Osaka; Tadayoshi Yonemoto, Neyagawa; Takashi Inoue; Shoji Nakamura, both of Hirakata, all of Japan

[73] Assignee: Matsushita Electric Industrial Co, Ltd., Osaka, Japan

[21] Appl. No.: 620,925

[22] Filed: Mar. 22, 1996

[30] Foreign Application Priority Data

Mar. 22, 1995 [JP] Japan .................. 7-062721

[51] Int. Cl.$^6$ .................. C03B 23/00
[52] U.S. Cl. .................. 65/102; 65/103; 65/111; 65/268; 65/269; 65/274; 65/275; 65/286; 65/292; 65/296; 65/305; 65/318; 65/319; 65/320; 65/348; 65/374.1; 65/374.11; 65/374.13
[58] Field of Search .................. 65/102, 103, 111, 65/268, 269, 274, 275, 286, 292, 296, 305, 318, 319, 320, 348, 374.1, 374.11, 374.13

[56] References Cited

U.S. PATENT DOCUMENTS

| | | | |
|---|---|---|---|
| 4,139,677 | 2/1979 | Blair et al. | 65/374.1 |
| 4,778,505 | 10/1988 | Hirota et al. | 65/102 |
| 4,889,548 | 12/1989 | Kriegesmann et al. | 65/305 |
| 5,173,100 | 12/1992 | Shigyo et al. | 65/102 |
| 5,188,652 | 2/1993 | Nakamura et al. | 65/286 |
| 5,194,082 | 3/1993 | Hirota . | |
| 5,284,501 | 2/1994 | Monji et al. | 65/102 |
| 5,346,522 | 9/1994 | Komiyama et al. | 65/102 |
| 5,403,370 | 4/1995 | Morikita | 65/286 |
| 5,538,528 | 7/1996 | Kashiwagi et al. | 65/275 |

FOREIGN PATENT DOCUMENTS

| | | | |
|---|---|---|---|
| 0 356 068 | 2/1990 | European Pat. Off. . | |
| 0 482 624 | 4/1992 | European Pat. Off. . | |
| 0 599 037 | 6/1994 | European Pat. Off. . | |
| 61-227929 | 10/1986 | Japan . | |
| 64-52621 | 2/1989 | Japan | 65/305 |
| 4-164826 | 6/1992 | Japan . | |
| 4-357121 | 12/1992 | Japan . | |
| 5-17170 | 1/1993 | Japan . | |
| 5-32333 | 5/1993 | Japan . | |
| 6-1623 | 1/1994 | Japan . | |
| 6-53580 | 7/1994 | Japan . | |

OTHER PUBLICATIONS

European Search Report dated Jul. 9, 1996.

*Primary Examiner*—Peter Chin
*Assistant Examiner*—Michael P. Colaianni
*Attorney, Agent, or Firm*—Ratner & Prestia

[57] ABSTRACT

A method and an apparatus for producing an optical element capable of performing a molding temperature control required for a plurality of independent molding blocks in a short period of time, and continuously and simultaneously producing a plurality of different optical elements having a high degree of accuracy at a low cost is provided.

44 Claims, 3 Drawing Sheets

METHOD AND APPARATUS FOR PRODUCING AN OPTICAL ELEMENT USING A MOLDING BLOCK AND A TEMPERATURE EFFECTING MECHANISM CONTACTING THE MOLDING BLOCK FOR HEAT EXCHANGE

BACKGROUND OF THE INVENTION

1. Field of the Invention

The present invention relates to a production method and a producing apparatus. More specifically, the present invention relates to a method and an apparatus suitable for precisely producing an optical element such as a lens and a prism.

2. Description of the Related Art

These days, a highly precise optical element is generally produced by introducing an optical element material into a mold, softened by heating, and molded under pressure. On the other hand, in order to reduce the production cost of lenses, the following methods are disclosed: a method in which a plurality of optical elements are simultaneously produced; and a method for producing lenses in which a molding cycle is shortened, so as to continuously perform press molding (e.g., Japanese Patent Publication No. 6-53580 and Japanese Laid-Open Patent Publication No. 4-164826.

According to the method disclosed in Japanese Patent Publication No. 6-53580 61-227929, a mold and an optical element material are placed on a trunk plate provided with a plurality of through holes, and are heated so as to be molded under pressure.

According to the method for producing lenses disclosed in Japanese Laid-Open Patent Publication No. 4-164826, a pair of molding blocks, each consisting of an upper mold, a lower mold and a trunk interposing a glass material therebetween, are subjected to processes of heating, deforming and cooling in this order.

However, the above-mentioned conventional techniques have the following drawbacks:

In the method disclosed in Japanese Patent Publication No. 6-53580, a plurality of molds and an optical element material are placed on one trunk plate, so that a volume of the trunk plate is increased. As a result, heat capacity is increased. Thus, this method requires a longer period of time for raising a temperature to a desired temperature, for reaching a point where a heat distribution is stabilized, and for lowering the temperature to a predetermined temperature after an optical element is molded. Thus, the producing apparatus performs inefficiently, resulting in extremely low productivity.

In the method disclosed in Japanese Laid-Open Patent Publication No. 4-164826, a producing process is divided into heating, deforming and cooling steps so as to improve a production efficiency. However, a molding cycle (molding tact) for ensuring lens performance is predetermined, so that several producing apparatuses are required in order to produce a greater number of products. As a result, the production cost of lenses cannot be sufficiently decreased because of an increase in facility investment. In the case where different lenses are simultaneously produced, another producing apparatus is required, thereby preventing reduction of the production cost of lenses from decreasing.

Furthermore, in the method disclosed in Japanese Laid-Open Patent Publication No. 4-164826, each stage of heating, deforming and cooling uses a simple structure provided with a heater, in which no treatment for making the temperature uniform on the stage surfaces nor treatment against oxidation are performed. Accordingly, there are the following problems: In simultaneously producing a plurality of lenses and in producing lenses having a large diameter, an obtained lens cannot have good performance; and the lives of the stages are short due to deterioration caused by oxidation on the surfaces of the stages, so as to generate costs for maintenance and replacement of the stages.

Furthermore, in the case where a molding block including an upper mold and a lower mold is used, the upper mold is upwardly elevated by adherence between the upper mold of the molding block and stages, resulting in a disruption in the molding process. In order to avoid this problem, a releasing device having such a structure is used in which the stages are each provided with a release pin or a compression spring. However, since the upper mold is required to be disposed in the position corresponding to the release pin, in the case where a plurality of lenses are simultaneously produced, as many pins as molds are required to be provided in each stage.

Therefore, problems arise in that the number of products to be simultaneously produced is limited by the number of the release pins. As many release pins, holes for receiving the pins, springs, etc., as products to be simultaneously produced are required. This raises the cost of production. Also, a process for producing a plurality of holes is required to be performed to an insulating plate, resulting in deterioration of temperature distribution of the stage.

SUMMARY OF THE INVENTION

A production method according to the present invention includes the steps of: a step of placing a molding material in at least one molding block; a first step of interposing the at least one molding block between a pair of stages; a second step of heating the at least one molding block so as to deform the molding material under pressure; a third step of cooling the at least one molding block so as to cool the molding material. Each of the pair of stages includes a temperature control device for controlling a temperature of the at least one molding block and a uniform temperature effecting device. In the second and third steps, the uniform temperature effecting device is directly contacted with the at least one molding block so as to cause heat exchange.

In one embodiment of the invention, in the second step and the third step heat is exchanged between the stages and the at least one molding block at each different pair of stages. The method includes a step of moving the at least one molding block from one pair of stages to another.

In another embodiment of the invention, the uniform temperature effecting device is formed of a super hard alloy having tungsten carbide as a main component.

In still another embodiment of the invention, the uniform temperature effecting device is coated with a thin film formed of either one of ceramics and cermet.

In yet another embodiment of the invention, the uniform temperature effecting device is coated with a thin film having either one of Pt, SiC, $Si_3N_4$, $Al_2O_3$, TiC and TiN as a main component.

In another embodiment of the invention, a temperature difference on a surface of the uniform temperature effecting device is controlled to be within about 2.5%.

In another embodiment of the invention, pressure is reduced at least once during a pressurizing process.

In another embodiment of the invention, the method includes a step of placing a cylindrical shaped optical element material as the molding material in the at least one molding block.

In another embodiment of the invention, at least in the third step, each heat capacity of the at least one molding block is adjusted so that a temperature change in the molding material is matched with a molding temperature profile for the molding material.

In another embodiment of the invention, in the second step and the third step, each heat capacity of the at least one molding block is adjusted so that a temperature change in the molding material is matched with a molding temperature profile for the molding material.

In another embodiment of the invention, the at least one molding block includes a pair of molds and a trunk.

In another embodiment of the invention, the trunk includes an adjusting trunk for changing heat capacity of the at least one molding block.

In another embodiment of the invention, a component material for the adjusting trunk for changing heat capacity of the at least one molding block is selected.

In another embodiment of the invention, the heat capacity is adjusted by varying a size of the at least one molding block.

According to another aspect of the invention, a production method includes the steps of: a step of placing a molding material in each of a plurality of molding blocks, a first step of interposing the plurality of molding blocks between a pair of stages, a second step of heating the plurality of molding blocks so as to deform the molding material under pressure, a third step of cooling the plurality of molding blocks so as to cool the molding material. Each of the pair of stages includes a temperature control device for controlling temperatures of the plurality of molding blocks and a uniform temperature effecting device. In each of the second and third steps, the uniform temperature effecting device is directly contacted with the plurality of molding blocks so as to cause heat exchange. At least in the third step, each heat capacity of the plurality of molding blocks is adjusted so that a temperature change in the molding material is matched with a molding temperature profile for the molding material.

In one embodiment of the invention, in the second step and the third step heat is exchanged between the stages and the plurality of molding blocks at each different pair of stages. The method includes a step of moving the plurality of molding blocks from one pair of states to another.

In another embodiment of the invention, the uniform temperature effecting device Is formed of a super hard alloy having tungsten carbide as a main component.

In still another embodiment of the invention, the uniform temperature effecting device is coated with a thin film formed of either one of ceramics and cermet.

In yet another embodiment of the invention, the thin film has either one of Pt, SiC, $Si_3N_4$, $Al_2O_3$, TiC and TiN as a main component.

In another embodiment of the invention, a temperature difference on a surface of the uniform temperature effecting device is controlled to be within about 2.5%.

In another embodiment of the invention, each of the second step and the third step heat is simultaneously exchanged between the stages and the plurality of molding blocks at the pair of stages.

In another embodiment of the invention, pressure is reduced at least once during a pressurizing process.

In another embodiment of the invention, the method includes a step of placing a cylindrical shaped optical element material as the molding material in each of the plurality of molding blocks.

In another embodiment of the invention, a pair of the plurality of molding blocks include a pair of molds and a trunk.

In another embodiment of the invention, the trunk includes an adjusting trunk for changing heat capacity of a pair of the plurality of the molding blocks.

In another embodiment of the invention, a material for the adjusting trunk for changing heat capacity of the plurality of molding blocks is selected.

In another embodiment of the invention, the heat capacity is adjusted by varying a size of each of the plurality of molding blocks.

In another embodiment of the invention, in the second step and the third step each heat capacity of the plurality of molding blocks is adjusted so that a temperature change in the molding material is matched with a molding temperature profile for the molding material.

According to still another aspect of the invention, a producing apparatus includes at least one pair of stages for interposing at least one molding block containing a molding material. Each of the at least one pair of stages includes a temperature control device for controlling temperature of the at least one molding block and a uniform temperature effecting device for directly contacting the at least one molding block so as to cause heat exchange.

In another embodiment of the invention, the apparatus includes a plurality of pairs of stages and devices for moving the at least one molding block between the plurality of stages. The molding material is heated, pressurized and cooled at each of the plurality of pairs of stages.

In another embodiment of the invention, the uniform temperature effecting device is formed of a super hard alloy having tungsten carbide as a main component.

In another embodiment of the invention, a surface of the uniform temperature effecting device In contact with the at least one molding block is coated with a thin film formed of either one of a metal, ceramics and cermet.

In another embodiment of the invention, the thin film has either one of Pt, SiC, $Si_3N_4$, $Al_2O_3$, TiC and TiN as a main component.

In another embodiment of the invention, a temperature distribution on a surface of the uniform temperature effecting device in contact with the at least one molding block is within about 2.5%.

According to another aspect of the invention, the apparatus includes at least one pair of stages consisting of an upper stage and a lower stage for interposing at least one molding block containing a molding material. Each of the at least one pair of stages includes a temperature control device for controlling a temperature of the at least one molding block, a uniform temperature effecting device for directly contacting the at least one molding block so as to cause heat exchange. The upper stage includes at least one groove at an interface with the at least one molding block, and a releasing tool including a contact section and a supporting section. The contact section is received in the groove when the at least one pair of stages interposes the at least one molding block. The contact section protrudes from the groove due to self-weight of the releasing tool so as to push the at least one molding block when the at least one pair of stages releases the at least one molding block.

In one embodiment of the invention, when adherent force of an interface between an upper mold and the upper stage is F, self-weight of the upper mold is W1, and self-weight of the releasing tool is W2, satisfies an inequality F<W1+W2.

In another embodiment of the invention, the apparatus includes a plurality of pairs of stages each for heating, pressurizing and cooling the molding material.

In still another embodiment of the invention, the uniform temperature effecting device is formed of a super hard alloy having tungsten carbide as a main component.

In yet another embodiment of the invention, a surface of the uniform temperature effecting device in contact with the at least one molding block is coated with a thin film formed of either one of a metal, ceramics and cermet.

In another embodiment of the invention, the thin film has either one of Pt, SiC, $Si_3N_4$, $Al_2O_3$, TiC and TiN as a main component.

In another embodiment of the invention, a temperature distribution on a surface of the uniform temperature effecting device in contact with the at least one molding block is within about 2.5%.

Thus, the invention described herein makes possible the advantages of providing a method and an apparatus for producing an optical element capable of performing molding temperature control required for a plurality of independent molding blocks in a short time, and simultaneously and continuously producing a plurality of different and highly precise optical elements at a low cost.

In order to achieve the above-mention advantages, the method for producing an optical element according to the present invention includes the steps of: placing a desired optical element material between the molds of a plurality of identical and independent molding blocks, each consisting of a pair of molds and a trunk; simultaneously introducing the plurality of molding blocks containing the optical element material into a heating furnace; both heating and softening the optical element material by a single heating device; molding the heated and softened optical element material under pressure; cooling the pressure-molded optical element material for transport outside the heating furnace; and retrieving optical elements from the molding blocks.

Furthermore, the method of the present invention includes the steps of: adjusting heat capacity of each independent and different molding block consisting of a pair of mold and trunk to match with a desired optical element molding temperature profile; placing a desired optical element material between the molds of the molding block; introducing the optical element material to a heating furnace; heating and softening the optical element material by a heating device; molding the heated and softened optical element material under pressure; cooling the pressure-molded optical element material for transport outside the heating furnace; and retrieving optical elements from the molding blocks.

Furthermore, the method of the present invention includes the steps of: adjusting heat capacity of a plurality of independent and different molding blocks Consisting of a pair of mold and trunk to match with a desired optical element molding temperature profile; placing a desired optical element material between the molds of the molding block; both heating and softening the optical element material by a single heating device; molding the heated and softened optical element material under pressure; cooling the pressure-molded optical element material for transport outside the heating furnace; and retrieving optical elements from the molding blocks.

Furthermore, the apparatus for producing an optical element of the present invention includes a plurality of pairs of temperature-controllable stages for pressure molding. At least one of the plurality of stages is provided with a device to make the temperature uniform, said device being directly in contact with a molding block between the molding block staying on the stages and the temperature controller.

Furthermore, in the apparatus for producing an optical element including a plurality of pairs of temperature-controllable stages for pressure molding, at least one of the pressurizable stages is provided with a desired groove at an interface between an upper mold of a molding block and an upper stage, and a mechanism for releasing the upper mold from the upper stage by self-weight of a releasing tool received in the groove.

According to the method and apparatus for producing an optical element of the present invention, an optical element material placed in a plurality of independent molding blocks is heated and softened by an identical heater excellent in temperature uniformity in a heating furnace for pressure-molding, resulting in a shorter period of time required for raising a temperature to a predetermined temperature, for obtaining a stable heat distribution, and for lowering the temperature to a predetermined temperature after an optical element is molded. As a result, a production tact is shortened.

Furthermore, since heat capacity of molding blocks is varied depending on the optical element material; in order to adjust an optical element molding temperature profile to a suitable one, different optical element are continuously produced in only one producing apparatus. In such a producing apparatus, a plurality of optical elements are simultaneously and stably produced by pressure molding.

As described above, according to the method and apparatus for producing an optical element of the present invention, an optical element material placed in a plurality of independent molding blocks is heated and softened by an identical heater excellent in temperature uniformity in a heating furnace for pressure-molding. This results in a shorter period of time required for raising a temperature to a predetermined temperature, for obtaining a stable heat distribution, and for lowering the temperature to a predetermined temperature after an optical element is molded. As a result, production tact is shortened. Furthermore, since heat capacity of molding blocks is varied depending on the optical element material; in order to adjust an optical element molding temperature profile to a suitable one, different optical elements are simultaneously produced. As a result, facility cost is lowered.

In the apparatus for producing an optical element, by providing a device to make the temperature uniform, said device being directly in contact with the molding blocks between the molding blocks staying on stages and a temperature controller; it is made possible to mold a plurality of optical elements and elements having a large diameter. Furthermore, adhesion between the molding block and the stage is raised due to pressure. Thus, conventionally, the upper mold is pulled away from the molding block due to the adhesion between the stage and the molding block in elevating the stage. However, by providing the releasing tool, not only is the upper mold not pulled away from the molding block any more, but also it becomes easier to simultaneously produce optical elements by a plurality of molding blocks.

These and other advantages of the present invention will become apparent to those skilled in the art upon reading and understanding the following detailed description with reference to the accompanying figures.

BRIEF DESCRIPTION OF THE DRAWINGS

FIG. 5 is a cross sectional view at section line 5—5 of the apparatus for producing an optical element shown in FIG. 1.

FIG. 6 is a graph showing a temperature distribution of a uniform temperature effecting device in Examples of the present invention.

FIG. 7A is a cross sectional view of a releasing tool in Examples of the present invention under no pressure.

FIG. 7B is a cross sectional view of the releasing tool in Examples of the present invention under pressure.

FIG. 9A is a graph showing a molding temperature characteristic of an optical element in one example of the present invention.

FIG. 9B is a graph showing a molding temperature characteristic of an optical element in another example of the present invention.

DESCRIPTION OF THE PREFERRED EMBODIMENTS

Hereinafter, the present invention will be described by way of examples with reference to the accompanying drawings.

EXAMPLE 1

Figure 1:
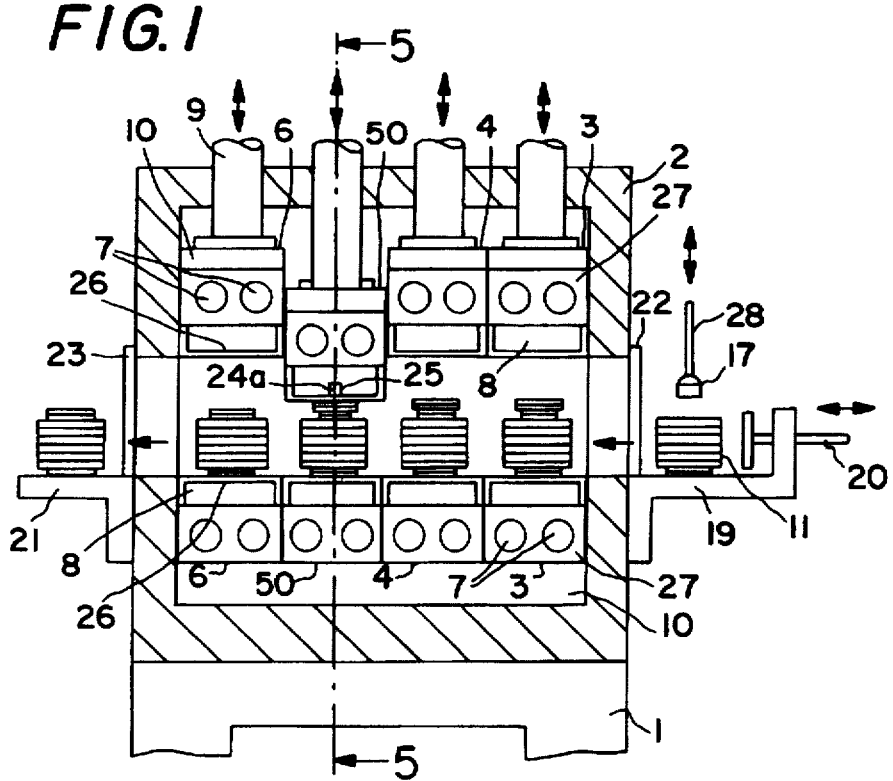
FIG. 1 is a schematic view showing a producing apparatus in Example 1 of the present invention.

FIG. 1 is a front view of an apparatus for producing an optical element to illustrate a method and an apparatus for producing an optical element of Example 1 of the present invention.

In the apparatus for producing an optical element shown in FIG. 1, a chamber 2 used for a heating furnace is provided on a table 1.

The chamber 2 is provided with an inlet for introducing a molding block 11 and an outlet for transporting the molding block away after being cooled. The inlet and the outlet have an inlet shutter 22 and an outlet shutter 23, respectively. A supply stage 19 is mounted at the entrance of the chamber, and a retrieval stage 21 is mounted at the exit of the chamber.

A first heating stage 3, a second heating stage 4, a pressure molding stage 50, and a cooling stage 6 are provided in the chamber 2. Temperature control blocks 27 provided with heaters 7 which can control the temperature in pairs are provided in each stage. A lower temperature control block 27 is provided via an insulating plate 10 in the chamber 2. An upper temperature control block 27 is provided via the insulating plate 10 having a vertically movable shaft 9, thereby having a function of pressing the molding block 11.

A super hard alloy having WC as the main component is provided in the surface of the temperature control block 27 so as to function as a uniform temperature effecting device 8. (Hereinafter, the temperature control block 27 secured in the chamber and the uniform temperature effecting device 8 are referred to as a lower stage, and the temperature control block 27 secured by the shaft 9 and the uniform temperature effecting device 8 are referred to as an upper stage. A pair of upper and lower stages is referred to as stages.)

Hereinafter, a method for producing an optical element using the apparatus for producing an optical element described above will be described with reference to the accompanying drawings.

As shown in FIG. 1, referring to the optical element material supply stage 19, a cylindrical shaped optical element material 17 is placed in the molding block 11 consisting an upper mold, a lower mold and a trunk by a supply device 28. Then, two identical and independent molding blocks 11 as shown in FIG. 5 are placed on the optical element material supply stage 19.

Then, respective stage temperatures and molding cycles of the apparatus for an optical element are set such that the optical element material 17 forms a suitable molding temperature profile (a control panel is not shown in Figures). Thereafter, the two identical molding blocks 11 are simultaneously introduced into the chamber 2 by an introduction pusher 20. In a first heating stage 3 and a second heating stage 4, the two identical molding blocks 11 are simultaneously preheated.

Generally, a molding temperature profile indicates a desired temperature change in a molding material with respect to a period of time at each process of heating, pressure molding and cooling processes, required to mold the molding material to ultimately obtain an optical element having a desired performance. This desired temperature change is predetermined by the temperature characteristic of the molding material, the size and shape of the optical element to be obtained, and the like. In the Examples of the present invention, the temperature change in the molding material is caused by heat exchange between each stage and the molding block containing the optical element material.

The molding block is sequentially moved from one stage to another in accordance with a predetermined molding cycle by transporting members (not shown) provided in the chamber. Two lumps of optical element material 17 are simultaneously pressurized by a pair of pressure molding stages 50, so as to deform the material to a desirably shaped optical element.

At this time, in the case where the optical element material 17 is cylinder-shaped, when the pressure by the pressure molding stages 50 is reduced or is made zero at least once during a pressing process while deforming the optical element material 17, defects such as a concave on a molded surface of the optical element are not generated.

After the pressure molding, the molding block 11 is transported onto the cooling stage 6 so as to be cooled to a desired temperature, and transported out from the exit of the chamber. An optical element is taken out from the molding block 11 on the retrieving stage 21.

Hereinafter, effects attained by using the uniform temperature effecting device 8 will be described.

When the adequacy of temperature uniformity is determined by a percentage (surface temperature difference/set temperature×100) of temperature distribution with respect to the set temperature in the molding range on the stage (the range required for molding attached to the molding block), unless the temperature difference in the molding range of the stage is within 2.5%, an optical element having a low performance is obtained.

For example, in the case where stainless steel is used for the stage, the temperature distribution with respect to the set temperature is 8%, as shown by a curve 41 in FIG. 6. This means that the temperature is not uniform in a wide range. Thus, it is found that a plurality of lenses and lenses having a large diameter cannot be produced. At this time, in the case where the uniform temperature effecting device 8 is used, the uniformity in the temperature is improved as shown by a curve 40 in FIG. 6. Namely, a temperature distribution of 2.5% with respect to the set temperature in the molding range on the stage is made possible.

A desirable uniformity in the temperature can be obtained by forming a thickness of 5 mm or more at the portion whose temperature is to be made uniform. However, in view of the production cost of the apparatus, a thickness of about 5 mm to about 10 mm is desirable. By controlling the temperature of the molding block via such a uniform temperature affecting device, it is made possible to precisely produce an optical element having a diameter of 25 mm or more, which has been conventionally difficult. More specifically, an optical element having about 70 mm diameter with a desired optical performance can be produced.

Furthermore, on the surface of the uniform temperature effecting device 8 is formed a thin film 26 having as the main component, platinum (Pt), silicon carbide (SiC), silicon nitride ($Si_3N_4$), alumina ($Al_2O_3$), titanium carbide (TiC), or titanium nitride (TiN), which are excellent in heat resistance and anti-oxidation. Thus, an effect of preventing the uniform temperature effecting device 8 from deteriorating due to oxidation can be attained by forming the thin film 26. In this example, a thickness of the thin film 26 is set at about 2 μm.

FIG. 5 shows a cross sectional view at section line 5—5 of the pressure molding stage 50 shown in FIG. 1. The upper stage is provided with a desired groove 25 at an interface between the upper mold 14 and the upper stage (uniform temperature effecting device 8). A releasing tool 24 including a contact rod 24a and a supporting section 24b is provided so as to suspend from an insulating plate 10 by self-weight.

The contact rod 24a of the releasing tool 24 is provided, for example, so as to slightly protrude from the pressing surface on the upper stage, as shown in FIG. 7A. When the upper mold 14 of the molding block 11 is pressed, the contact rod 24a is received in the groove 25 provided in the stage, as shown in FIG. 7B. In this manner, the contact rod 24a is vertically movable.

Conventionally, pressure is large on the pressure molding stage, and the surfaces of the stage and the molding block are produced as being smooth enough to transmit the molding temperature on the stage sufficiently fast. As a result, the adhesion between the upper mold of the molding block and the upper stage is high. Thus, when the upper stage is elevated after an optical element is molded, a high adherent force between the upper stage and the upper mold causes such problems that the upper mold being pulled away from the molding block, so that the upper mold is broken, and the molding process is disrupted. However, by providing the releasing tool 24 as shown in FIG. 7, it is possible to add a larger force (self-weight of the releasing tool) than the adherent force to the upper mold 14. Thus, the upper mold is prevented from pulling away from the molding block, so as to solve the above-mentioned problem. More specifically, in the case where the adherent force at the interface between the upper mold 14 and the upper stage is set as F, self-weight of the upper mold 14 is set as W1, and self-weight of the releasing tool 24 is set as W2; the self-weight of the releasing tool 24 is set so as to satisfy an inequality F<W1+W2. Since this structure is such that the releasing tool 24 pushes the upper mold 14 by its self-weight, it is unnecessary to provide a compression spring in the releasing tool for the purpose of adding resiliency greater than the adherent force F. Therefore, there is no problem such as deterioration of the spring due to the heat of the stage. Furthermore, it is sufficient to provide a groove for receiving the contact rod in the stage, so that the uniformity of the temperature distribution on the surface in contact with the upper mold 14 is not impaired.

Hereinafter, an specific example using the producing apparatus shown in FIG. 1 will be described.

A super hard alloy (WC—Ni—Cr alloy) is used for the uniform temperature affecting device 8, and a surface thereof is coated with a thin film 26 formed of a platinum-tantalum-rhenium alloy.

As the optical element material 17, VC 78 (manufactured by Sumida Optical Glass Co., Ltd., having a glass transition temperature of 530° C., a yielding temperature of 562° C., and a linear expansion coefficient of $95 \times 10^{-7}$ (100° to 300° C.)) is used. The glass transition temperature and the yielding temperature of VC 78 is obtained by measuring an elongation percentage.

The temperature characteristic of a glass material is indicated by a glass transition temperature, a yielding temperature and a softening temperatures The glass transition temperature, the yielding temperature and the softening temperature are obtained from a change in viscosity of the glass material in accordance with an increasing temperature. The glass transition temperature, the yielding temperature and the softening temperature are defined as temperatures in the case where the viscosity of the glass material is $10^{12.75}$Poise, $10^{10.35}$poise and $10^{7.65}$poise, respectively. The temperature characteristic of other materials, for example, plastic is determined by a measurement method suitable to the material.

A first heating stage is set at 550° C., which is equal to or more than a glass transition temperature, and equal to or less than a yielding temperature. A second heating stage is set at 575° C., which is more than a yielding temperature. A pressure molding stage is set at 575° C., and a cooling stage is set at 510° C., which is lower than the glass transition temperature. The pressure applied onto the pressure molding stage 50 is reduced seven times during the pressure molding process.

As shown in FIG. 1, two identical independent molding blocks 11 at a time are sequentially moved from one stage to another, and stay on each stage for 90 seconds, so as to produce optical elements. As a result, a plurality of convex lenses having a desired lens performance with no defects are simultaneously obtained.

Furthermore, on the pressure molding stage, the upper mold of the molding block does not adhere to the upper stage, whereby a continuous operation is stably performed in the apparatus.

EXAMPLE 2

Hereinafter, the present invention will be described by way of another example with reference to the accompanying drawings.

Figure 2:
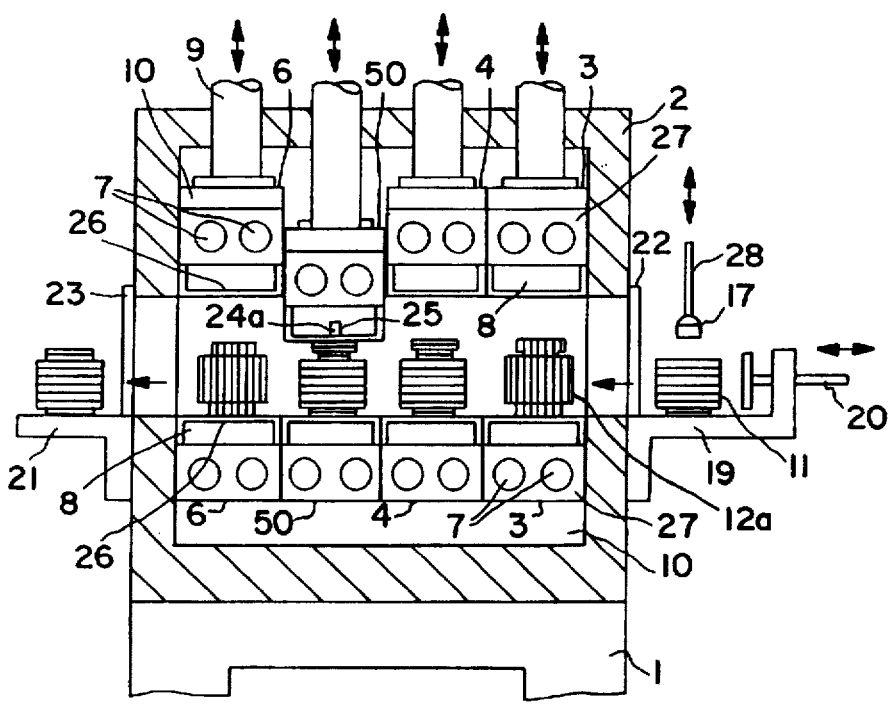
FIG. 2 is a schematic view showing a producing apparatus in Example 2 of the present invention.

FIG. 2 is a front view of an apparatus for producing an optical element showing a method and an apparatus for producing an optical element of Example 2 of the present invention.

The apparatus for producing an optical element shown in FIG. 2 has the same structure as the apparatus of Example 1. Using the apparatus, a method for producing an optical element by continuously molding optical element materials having the same temperature characteristic by molding blocks having different shapes will be described below. The phrase, "materials having the same temperature characteristic" means materials having at least the same value of the glass transition temperature under the same measurement conditions. The materials may have the same values of the yielding temperature and the softening temperature or the linear expansion coefficient.

Figure 8A:
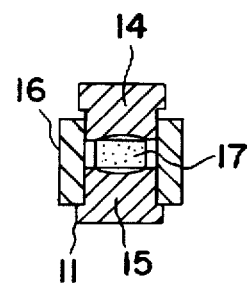
FIG. 8A is a cross sectional view of a molding block of the present invention.
Figure 8B:
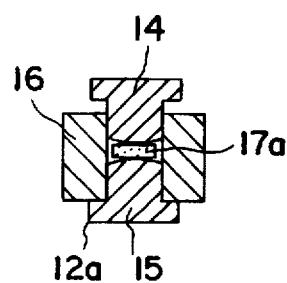
FIG. 8B is another cross sectional view of the molding block of the present invention.

The molding blocks having different shapes in Example 2 are shown as a first molding block 11 and a second molding block 12a in FIGS. 8A and 8B, respectively. A molding temperature profile for the optical element material 17 in one molding cycle is shown in FIG. 9A.

For example, the first molding block 11 in FIG. 8A and the second molding block 12a in FIG. 8B have different shapes of optical element molding surfaces, and thus the shape of optical element to be obtained by each molding block is different. However, even in this case, provided that the first and second molding blocks 11 and 12a have the same temperature characteristic (at least the glass transition temperature), the molding temperature profiles for the optical elements to be obtained by respective molding blocks can be identical by adjusting heat capacities of the first molding block 11 and the second molding block 12a so as to be equal.

One method for adjusting the heat capacities is that the size of one of the molding blocks (e.g., the second molding block 12a) is varied so that the heat capacity thereof is matched with that of the other molding block (e.g., the first molding block 11).

It is difficult and costly to perform a process to the upper mold 14 and the lower mold 15 having precise shapes, or produce new molds, for the purpose of varying the size of the molding block. Therefore, it is desirable to adjust the size of the trunk 16.

The heat capacity is simply calculated by adding a result of a specific heat (J/(kg·°C.))×mass (kg) of a material used for the molding block to that of the optical element material. Thus, for example, the size of the molding block can be easily adjusted to a suitable size in a heat capacity adjusting process (heat capacity adjusting stage (not shown)).

According to the method for producing an optical element, even if molding is simultaneously performed by the first molding block 11 and the second molding block 12a in the same apparatus and under the same conditions, the temperature profile for each of the molding blocks can be adjusted to a suitable molding temperature profile 30 matched with the temperature characteristic of the optical element material 17 (a glass temperature 34) shown in FIG. 9A. As a result, desired optical elements are simultaneously obtained by both of the molding blocks.

Furthermore, a plurality of optical elements can be simultaneously and continuously produced as in Example 1 by using the same apparatus as shown in FIG. 19

A specific example using the producing apparatus shown in FIG. 2 will be described below.

A super hard alloy (WC—Co alloy) is used for the uniform temperature effecting device 8, and a surface thereof is coated with a thin film 26 formed of a titanium-nitride-aluminum (Ti—N—Al) alloy.

In the same manner as in Example 1, a first heating stage is set at 550° C. A second heating stage is set at 575° C. A pressure molding stage is set at 575° C., and a cooling stage is set at 510° C. The pressure applied onto the pressure molding stage 50 is reduced seven times during the pressure molding process.

Each of the heat capacities of the first molding block 11 in FIG. 8A and the second molding block 12a in FIG. 8B containing the optical element material 17 is adjusted to 46 J/°C. on the heat capacity adjusting stage (not shown). On the optical element material supply stage 19, a cylindrical shaped optical element material 17 (VC 78 manufactured by Sumida Optical Glass Co., Ltd.) having a glass temperature of 530° C. is placed in the first molding block 11 and the second molding block 12a. Then, under the above-mentioned conditions, two independent molding blocks at a time are sequentially moved from one stage to another, and stay on each stage for 90 seconds, so as to produce an optical element. As a result, a plurality of lenses having the same temperature characteristic and different shapes, i.e., convex and concave lenses, having a desired lens performance with no defect are simultaneously produced.

EXAMPLE 3

Hereinafter, the present invention will be described by way of another example with reference to the accompanying drawings.

Figure 3:
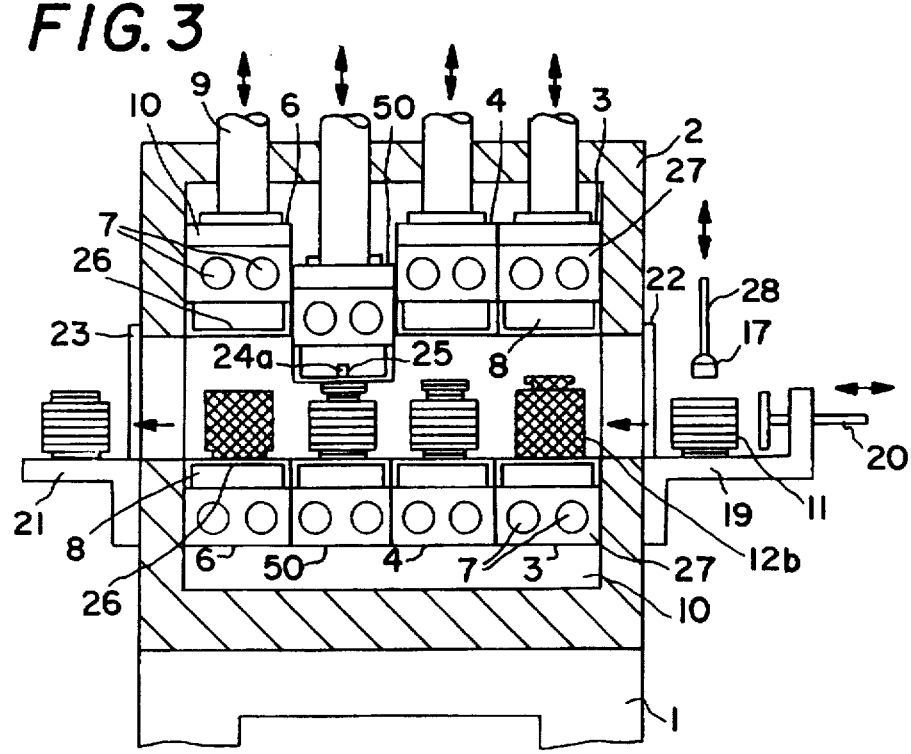
FIG. 3 is a schematic view showing a producing apparatus in Example 3 of the present invention.

FIG. 3 is a front view of an apparatus for producing an optical element showing a method and an apparatus for producing an optical element of Example 3 of the present invention.

The apparatus for producing an optical element shown in FIG. 3 has the same structure as the apparatus of Example 1. Using the apparatus, another method for producing a desired optical element by continuously molding optical element materials having the same temperature characteristic by each of molding blocks having different shapes in the same manner as in Example 2 will be described below.

Figure 8C:
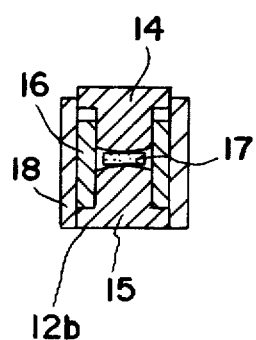
FIG. 8C is yet another cross sectional view of the molding block of the present invention.

The molding blocks having different shapes in Example 3 are shown as a first molding block 11 shown in FIG. 8A and a second molding block 12b shown in FIG. 8C. A desired optical element molding temperature profile for the optical element material 17 is shown in FIG. 9A. The second molding block 12b shown in FIG. 8C includes an upper mold 14 and a lower mold 15 having the same shapes as the second molding block 12a shown in FIG. 8B. Moreover, the second molding block 12b includes an adjusting trunk 18 in addition to a trunk 16.

As described in Example 2, the adjustment of the heat capacity by varying the size of the trunk 16 is conducted by using either a method of performing a process or producing a new trunk 16.

However, the method of performing a process to the trunk can be adopted only for the purpose of reducing heat capacity. In the method of Example 2 for producing a new trunk, a high degree of processing accuracy may be required. The level of processing accuracy is dependent upon the specification of the optical element, so that a precise fitting between the trunk and both the upper and lower molds can be obtained. Therefore, the production cost may become extremely high.

A method other than that used in Example 2 is that a molding block including the trunk 18 for adjusting heat capacity as the second molding block 12b in FIG. 8C, is used in place of the second molding block 12a in FIG. 8B. In this case, even if an accuracy of the fitting between the trunk 16 and the adjusting trunk 18 is lowered, lens performance is not impaired. In addition, the adjusting trunk is can be advantageously produced at a low cost.

Furthermore, since no portion of the adjusting trunk 18 is in contact with the optical element material, it is unnecessary to take reactions with glass, oxidation, etc., into consideration. Thus, a material for the adjusting trunk 18 can be selected in a great degree of discretion, so that the adjusting trunk 18 can be advantageously produced using an inexpensive material having a better proccesability than the material for the upper mold 14, the lower mold 15 and the trunk 16. The material for the adjusting trunk 18 can be aluminum, steel, stainless steel or the like. Furthermore, by selecting a material having a suitable specific heat, heat capacity can be adjusted.

As described in Example 2, even if the second molding block 12b shown in FIG. 8C is used in place of the second molding block 12a shown in FIG. 8B, desired optical elements are simultaneously obtained by both of the molding blocks. That is because, provided that an optical element material 17 for the first molding block 11 in FIG. 8A has the same temperature characteristic (a glass temperature 34) as that for the second molding block 12b in FIG. 8C, the temperature profile for each of the molding blocks can be adjusted to a suitable molding temperature profile 30 for the temperature characteristic of the optical element material 17 (having a glass temperature 34) shown in FIG. 9A. This is attained simply by adjusting heat capacities of the first molding block 11 and the second molding block 12b so as to be equal. Thus, even if shapes of optical elements to be obtained are different, desired optical elements can be obtained by molding simultaneously using both of the molding blocks in the producing apparatus shown in FIG. 3.

Furthermore, a plurality of optical elements can be simultaneously and continuously produced as in Example 1 by using the same apparatus as shown in FIG. 1.

A specific example using the producing apparatus shown in FIG. 3 will be described below.

The same materials as used in Example 2 are used for the base metal and the uniform temperature affecting device 8 and a thin film 26 on the surface thereof.

In the same manner as in Example 1, a first heating stage is set at 550° C. A second heating stage is set at 575° C. A pressure molding stage is set at 575° C., and a cooling stage is set at 510° C. The pressure applied onto the pressure molding stage 50 is reduced seven times during the pressure molding process.

A heat capacity of the first molding block 11 in FIG. 8A containing the optical element material 17 is adjusted to 46 J/°C. A heat capacity of the second molding block 12b in FIG. 8C containing the optical element material 17 is adjusted to 29 J/°C. On the heat capacity adjusting stage (not shown), the adjusting trunk 18 having a heat capacity of 17 J/°C. is mounted on the second molding block 12b. Then, on the optical element material supply stage 19, two types of cylindrical shaped optical element material 17 (VC 78 manufactured by Sumida Optical Glass Co., Ltd.) having a glass temperature of 530° C. are supplied to the first molding block 11 and the second molding block 12b. Then, under the above-mentioned conditions, two independent molding blocks at a time are sequentially moved from one stage to another, and stay on each stage for 90 seconds, so as to produce optical elements. As a result, a plurality of lenses having the same temperature characteristic and different shapes, i.e., convex and concave lenses, having a desired lens performance with no defect are simultaneously produced.

EXAMPLE 4

Hereinafter, the present invention will be described by way of another example with reference to the accompanying drawings.

Figure 4:
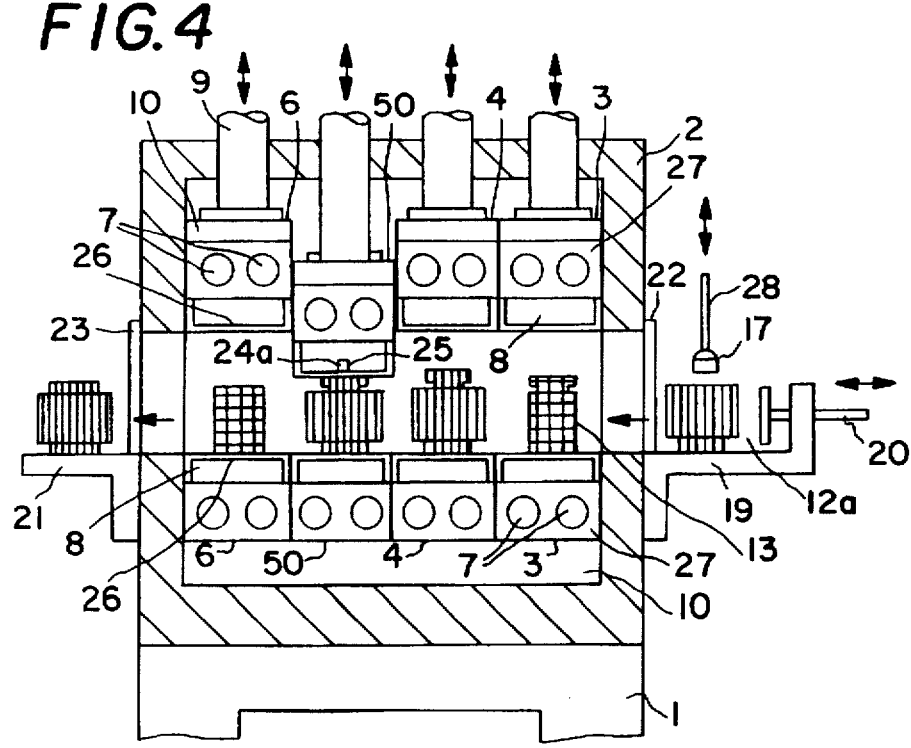
FIG. 4 is a schematic view showing a producing apparatus in Example 4 of the present invention.

FIG. 4 is a front view of an apparatus for producing an optical element showing a method and an apparatus for producing an optical element of Example 4 of the present invention.

The apparatus for producing an optical element shown in FIG. 4 has the same structure as the apparatus of Example 1. Using the apparatus, a method for producing a desired optical element by continuously molding optical element materials having different temperature characteristics by molding blocks having different shapes will be described below.

Figure 8D:
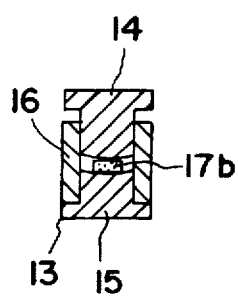
FIG. 8D is still another cross sectional view of the molding block of the present invention.

The molding blocks having different shapes in Example 4 are shown as a second molding block 12a shown in FIG. 8B and a third molding block 13 shown in FIG. 8D. For example, the optical element material 17 for the second molding block 12a has a characteristic of a first glass transition temperature 35 (a transition point 33 is higher) shown in FIG. 9B. The optical element material 17 for the third molding block 13 has a characteristic of a second glass transition temperature 36 (the transition point 33 is lower) shown in FIG. 9B.

A suitable molding temperature profile for the optical element material 17 having the higher transition point 33 is indicated by line 31 (bold line) shown in FIG. 9B. A suitable molding temperature profile for the optical element material 17 having the lower transition point 33 is indicated by line 32 (light line) shown in FIG. 9B.

In the case the optical element materials having different temperature characteristics are to be molded, a molding temperature profile suitable for each optical element material is required. Basically, in a cooling step during a process of molding the optical element material, the optical element material is cooled at a suitable cooling temperature profile (i.e., a temperature history from a pressurizing temperature to a temperature below the transition point 33 of the optical element material), so as to obtain an optical element having a desired lens performance.

In order for optical element materials having different temperature characteristics placed in the second molding block 12a in FIG. 8B and the third molding block 13 in FIG. 8D to be continuously molded under the same conditions in the apparatus shown in FIG. 4, it is important to ensure that temperatures of the optical element materials trace the molding temperature profile 31 (having the higher transition point 33) and the molding temperature profile 32 (having the lower transition point 33) shown in FIG. 9B, respectively, by adjusting the heat capacities of the molding blocks 12a and 13.

For example, conditions such as temperature conditions and molding cycles of the producing apparatus are set such that the optical element material 17a having the first glass transition temperature 35 is molded by the second molding block 12a in accordance with the molding temperature profile 31 in FIG. 9B. Thereafter, the optical element material 17b having the second glass transition temperature 36 is molded by the third molding block 13 in the same producing apparatus under the same molding conditions. In this case, when the heat capacity of the third molding block 13 is adjusted to be equal to that of the second molding block 12a, the optical element material being molded by the third molding block 13 traces the molding temperature profile 31, resulting in a poor performance of an obtained optical element.

However, if the size of the third molding block 13 is varied, and the heat capacity is adjusted to be reduced, a period of time required for a cooling process at the cooling stage is shortened by the reduction in the size and the heat capacity. As a result, a cooling gradient is varied, so that it is possible to match the molding temperature profile for the optical element material being molded by the third molding block 13 with the molding temperature profile 32 for the temperature characteristic having a lower transition point 33 (glass transition temperature 36). Thus, an optical element having a desired performance can be obtained. Therefore, the optical element materials 17a and 17b having different temperature characteristics are sufficiently cooled from the pressure molding temperature to respective glass transition temperatures in the same period of cooling time. This makes possible to continuously produce optical elements having different characteristics in the same producing apparatus and the same molding cycle.

The heat capacity is simply calculated by using a specific heat (J/(kg·°C.))×mass (kg) of a material used for the molding block and an optical element material. Thus, for example, the size of the molding block can be easily adjusted to a suitable size in a heat capacity adjusting process (heat capacity adjusting stage (not shown)) in accordance with a temperature characteristic of an optical element material.

A specific example using the producing apparatus shown in FIG. 4 will be described below.

A super hard alloy (WC—Co—Ni—Cr alloy) is used for the uniform temperature affecting device 8, and a surface thereof is coated with a thin film 26 formed of a cermet (Ti—C—Mo—Ni).

A first heating stage is set at 530° C. A second heating stage is set at 565° C. A pressure molding stage is set at 565° C., and a cooling stage is set at 495° C. The pressure applied onto the pressure molding stage 50 is reduced five times during the pressure molding process.

A heat capacity of the second molding block 12a in FIG. 8B containing the optical element material 17a is adjusted to 46 J/°C. A heat capacity of the third molding block 13 in FIG. 8D containing the optical element material 17b is adjusted to 25 J/°C. Each adjustment of the heat capacity is conducted on the heat capacity adjusting stage (not shown). Then, on the optical element material supply stage 19, a cylindrical shaped optical element material 17a (VC 79 manufactured by Sumida Optical Glass Co., Ltd.) having a glass temperature of 516° C. and a yielding temperature of 553° C. is placed on the second molding block 12a. A cylindrical shaped optical element material 17b (PBX 40 manufactured by Sumida Optical Glass Co., Ltd.) having a glass temperature of 502° C. and a yielding temperature of 549° C. is placed on the third molding block 13. Then, at the above-mentioned temperatures of the stages, two independent molding block consisting of one each are sequentially moved from one stage to another, and stay on each stage for 90 seconds, so as to produce optical elements. As a result, lenses having different temperature characteristic i.e., convex lenses and meniscus lenses, having a desired lens performance with no defect can be continuously produced.

Although the present invention has been described in detail by way of examples, the present invention is not limited to the description in the Examples with regard to such matters as the optical element materials and the temperature characteristics and shapes thereof; the number of the optical elements to be simultaneously molded; the shape of the optical element; the shape and heat capacity of the molding block; the material; shape and heat capacity of the adjusting trunk; the procedure and means of the heat capacity adjusting operation, the structure of the producing apparatus; the molding conditions and the number of stages of the producing apparatus; the material and shape of the uniform temperature effecting device; the material of the thin film coating the uniform temperature effecting device; the shape and the number of the grooves on the upper stage; the shape and the number of the releasing tool; the method for providing the releasing tool; and the like.

Although a method and an apparatus for producing an optical element using a glass material has been specifically described in Examples of the present invention, a material to be used is not limited to the glass material. It is possible to use a plastic material for optical elements (e.g., Zeonex (manufactured by Nippon Zeon Co., Ltd.) or the like. Moreover, although the present invention is most suitable for producing an optical element, because the production of the optical element requires a high degree of accuracy, it is apparent that the present invention can be utilized for producing other elements.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A production method comprising:
    a step of placing a molding material in at least one molding block,
    a first step of interposing the at least one molding block between a pair of stages,
    a second step of heating the at least one molding block so as to deform the molding material under pressure, and
    a third step of cooling the at least one molding block so as to cool the molding material, the third step including a step of adjusting each heat capacity of the at least one molding block so that a temperature change in the molding material is matched with a molding temperature profile for the molding material;
    each of the pair of stages comprising temperature control means for controlling a temperature of the at least one molding block and uniform temperature effecting means, wherein, in the second and third steps, the uniform temperature effecting means is directly contacted with the at least one molding block so as to cause heat exchange.

2. A production method according to claim 1, wherein, in the second step and the third step heat is exchanged between the stages and the at least one molding block at each different pair of stages, the method comprising a step of moving the at least one molding block from one pair of stages to another.

3. A production method according to claim 1, wherein the uniform temperature effecting means is formed of a super hard alloy having tungsten carbide as a main component.

4. A production method according to claim 1, wherein the uniform temperature effecting means is coated with a thin film formed of either one of ceramics and cermet.

5. A production method according to claim 4, wherein the uniform temperature effecting means is coated with a thin film having either one of Pt, SiC, $Si_3N_4$, $Al_2O_3$, TiC and TiN as a main component.

6. A production method according to claim 1, wherein a temperature difference on a surface of the uniform temperature effecting means is controlled to be within about 2.5%.

7. A production method according to claim 1, wherein pressure is reduced at least once during a pressurizing process.

8. A production method according to claim 7 comprising a step of placing a cylindrical shaped optical element material as the molding material in the at least one molding block.

9. A production method according to claim 1, wherein, in the second step and the third step, each heat capacity of the at least one molding block is adjusted so that a temperature change in the molding material is matched with a molding temperature profile for the molding material.

10. A production method according to claim 1, wherein the at least one molding block includes a pair of molds and a trunk.

11. A production method according to claim 10, wherein the trunk includes an adjusting trunk for changing heat capacity of the at least one molding block.

12. A production method according to claim 11, wherein a component material for the adjusting trunk for changing heat capacity of the at least one molding block is selected from the group consisting of aluminum, steel, stainless steel and the like.

13. A production method according to claim 1, wherein a component material for the adjusting trunk for changing heat capacity is adjusted by varying size of the at least one molding block.

14. A production method comprising:
a step of placing a plurality of molding materials having different temperature characteristics in a plurality of molding blocks,
a step of modifying at least one of the molding blocks by altering the heat capacity thereof,
a first step of interposing the plurality of molding blocks between a pair of stages,
a second step of heating the plurality of molding blocks so as to deform the molding material under pressure, and
a third step of cooling the plurality of molding blocks so as to cool the molding material,
wherein each of the pair of stages comprises: temperature control means for controlling temperatures of the plurality of molding blocks, and uniform temperature effecting means, and in each of the second and third steps, the uniform temperature effecting means is directly contacted with the plurality of molding blocks so as to cause heat exchange;
at least in the third step, each heat capacity of the plurality of molding blocks is adjusted so that a temperature change in the molding material is matched with a molding temperature profile for the molding material, and
wherein the modified molding block effectuates a different temperature characteristic.

15. A production method according to claim 14, wherein, in the second step and the third step heat is exchanged between the stages and the plurality of molding blocks at each different pair of stages, the method comprising a step of moving the plurality of molding blocks from one pair of stages to another.

16. A production method according to claim 14, wherein the uniform temperature effecting means is formed of a super hard alloy having tungsten carbide as a main component.

17. A production method according to claim 17, wherein the uniform temperature effecting means is coated with a thin film formed of either one of ceramics and cermet.

18. A production method according to claim 17, wherein the thin film has either one of Pt, SiC, $Si_3N_4$, $Al_2O_3$, TiC and TiN as a main component.

19. A production method according to claim 14, wherein a temperature difference on a surface of the uniform temperature effecting means is controlled to be within about 2.5%.

20. A production method according to claim 14, wherein, in each of the second step and the third step heat is simultaneously exchanged between the stages and the plurality of molding blocks at the pair of stages.

21. A production method according to claim 14, wherein pressure is reduced at least once during a pressurizing process.

22. A production method according to claim 21 comprising a step of placing a cylindrical shaped optical element material as the molding material in each of the plurality of molding blocks.

23. A production method according to claim 14, wherein a pair of the plurality of molding blocks include a pair of molds and a trunk.

24. A production method according to claim 23, wherein the trunk includes an adjusting trunk for changing heat capacity of a pair of the plurality of the molding blocks.

25. A production method according to claim 24, wherein a component material for the adjusting trunk for changing heat capacity of the plurality of molding blocks is selected from the group consisting of aluminum, steel stainless steel and the like.

26. A production method according to claim 14, wherein the heat capacity is adjusted by varying a size of each of the plurality of molding blocks.

27. A production method according to claim 14, wherein, in the second step and the third step each heat capacity of the plurality of molding blocks is adjusted so that a temperature change in the molding material is matched with a molding temperature profile for the molding material.

28. A producing apparatus comprising:
at least one pair of stages for interposing at least one molding block containing a molding material, each of the at least one pair of stages comprising:
temperature control means for controlling temperature of the at least one molding block, and
uniform temperature effecting means for directly contacting the at least one molding block so as to cause heat exchange, said uniform temperature effecting means being formed of a super hard alloy having tungsten carbide as a main component.

29. A producing apparatus according to claim 28 comprising a plurality of pairs of stages and means for moving the at least one molding block between the plurality of stages, the molding material being heated, pressurized and cooled at each of the plurality of pairs of stages.

30. A producing apparatus according to claim 28, wherein a surface of the uniform temperature effecting means in contact with the at least one molding block is coated with a thin film formed of either one of a metal, ceramics and cermet.

31. A producing apparatus according to claim 30, wherein the thin film has either one of Pt, SiC, $Si_3N_4$, $Al_2O_3$, TiC and TiN as a main component.

32. A producing apparatus according to claim 28, wherein a temperature distribution on a surface of the uniform temperature effecting means in contact with the at least one molding block is within about 2.5%.

33. A producing apparatus comprising at least one pair of stages consisting of an upper stage and a lower stage for interposing at least one molding block containing a molding material;
each of the at least one pair of stages comprising:
temperature control means for controlling a temperature of the at least one molding block,
uniform temperature effecting means for directly contacting the at least one molding block so as to cause heat exchange;

the upper stage comprising at least one groove at an interface with the at least one molding block, and a releasing tool including a contact section and a supporting section; the contact section being received in the groove when the at least one pair of stages interposes the at least one molding block, the contact section protruding from the groove due to self-weight of the releasing tool so as to push the at least one molding block when the at least one pair of stages releases the at least one molding block.

34. A producing apparatus according to claim 33, wherein, when adherent force of an interface between an upper mold and the upper stage is F, self-weight of the upper mold is W1, and self-weight of the releasing tool is W2, W2 satisfies an inequality F<W1+W2.

35. A producing apparatus according to claim 33 comprising a plurality of pairs of stages each for heating, pressurizing and cooling the molding material.

36. A producing apparatus according to claim 33, wherein the uniform temperature effecting means is formed of a super hard alloy having tungsten carbide as a main component.

37. A producing apparatus according to claim 33, wherein a surface of the uniform temperature effecting means in contact with the at least one molding block is coated with a thin film formed of either one of a metal, ceramics and cermet.

38. A producing apparatus according to claim 37, wherein the thin film has either one of Pt, SiC, $Si_3N_4$, $Al_2O_3$, TiC and TiN as a main component.

39. A producing apparatus according to claim 33, wherein a temperature distribution on a surface of the uniform temperature effecting means in contact with the at least one molding block is within about 2.5%.

40. A production method comprising:

a step of placing a plurality of molding materials having the same temperature characteristic in a plurality of molding blocks;

a step of modifying at least one of the molding blocks by altering the heat capacity thereof;

a first step of interposing the plurality of molding blocks between a pair of stages, each of the pair of stages comprising temperature control means for controlling a temperature of the plurality of molding blocks and uniform temperature effecting means;

a second step of heating the plurality of molding blocks so as to deform the molding material under pressure; and a third step of cooling the plurality of molding blocks so as to cool the molding material, including a step of adjusting each heat capacity of the plurality of molding blocks so that a temperature change in the molding material is matched with a molding temperature profile for the molding material, wherein, in the second and third steps, the uniform temperature effecting means is directly contacted with the plurality of molding blocks so as to cause heat exchange, and wherein a plurality of optical elements having different sizes or shapes are produced.

41. A production method according to claim 11, wherein a component material for the adjusting trunk for changing heat capacity of the at least one molding block is selected from the group consisting of steel and stainless steel.

42. A production method according to claim 24, wherein a component material for the adjusting trunk for changing heat capacity of the plurality of molding blocks is selected from the group consisting of steel and stainless steel.

43. A production method according to claim 11, wherein a component material for the adjusting trunk for changing heat capacity of the plurality of molding blocks is aluminum.

44. A production method according to claim 24, wherein a component material for the adjusting trunk for changing heat capacity of the plurality of molding blocks is aluminum.

* * * * *

UNITED STATES PATENT AND TRADEMARK OFFICE
CERTIFICATE OF CORRECTION

PATENT NO.    : 5,766,294
DATED         : June 16, 1998
INVENTOR(S)   : K. Takagi et al.

It is certified that error appears in the above-identified patent and that said Letters Patent is hereby corrected as shown below:

Column 1, line 29, delete "61-227929".

Column 17, claim 17, line 58, delete "claim 17," and insert --claim 14,--.

Signed and Sealed this

Twenty-eighth Day of September, 1999

Attest:

Q. TODD DICKINSON

*Attesting Officer*         *Acting Commissioner of Patents and Trademarks*